(No Model.)
C. ALISON.
FRUIT CUTTING AND PITTING MACHINE.
No. 293,841. Patented Feb. 19, 1884.
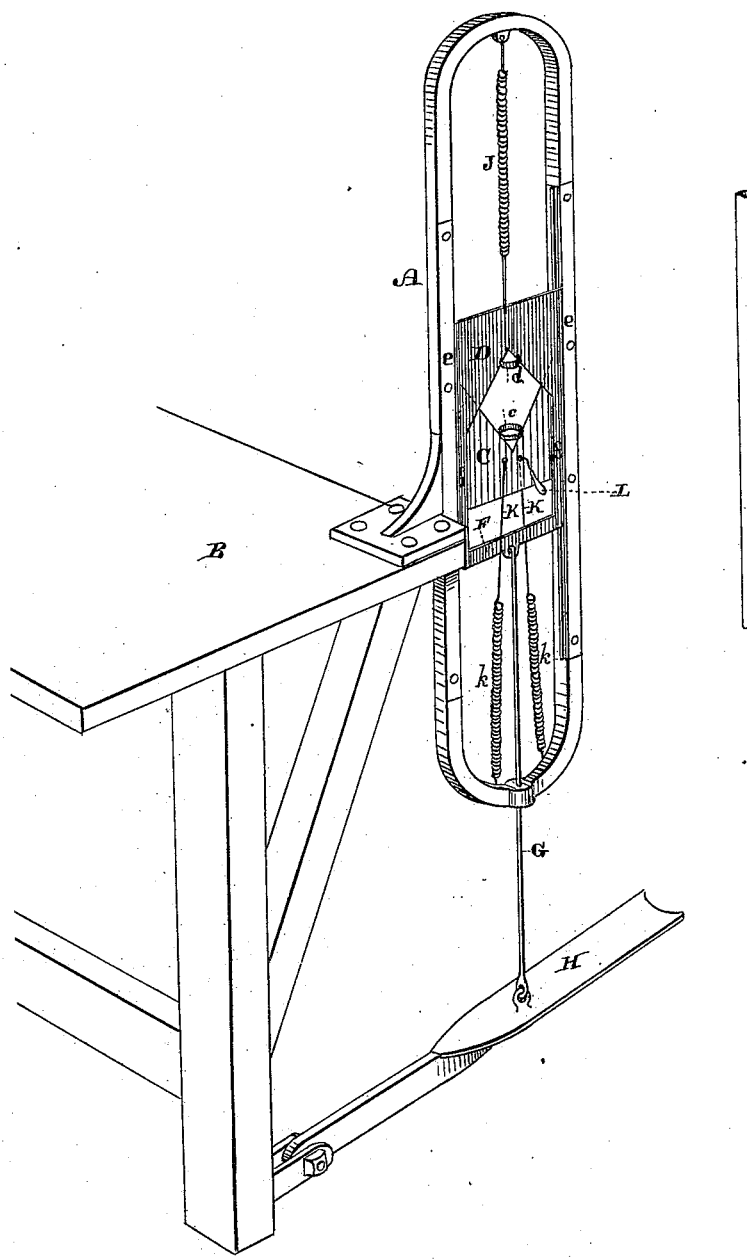
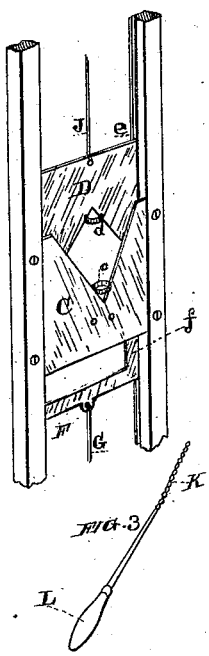
Witnesses,
Geo. H. Strong
Inventor,
Chas. Alison
Dewey & Co.
Attorneys

UNITED STATES PATENT OFFICE.

CHARLES ALISON, OF SAN FRANCISCO, CALIFORNIA.

FRUIT CUTTING AND PITTING MACHINE.

SPECIFICATION forming part of Letters Patent No. 293,841, dated February 19, 1884.

Application filed November 5, 1883. (No model.)

*To all whom it may concern:*

Be it known that I, CHARLES ALISON, of the city and county of San Francisco, and State of California, have invented an Improvement in Fruit Cutting and Pitting Machines; and I hereby declare the following to be a full, clear, and exact description thereof.

My invention relates to a new and useful machine for cutting and pitting fruit; and it consists in opposing V-shaped knives, inclosing a space for the reception of the fruit, and adapted to cut the meat to the pit, a thimble or band in the angle of each cutting-edge for retaining the pit, and a flexible line for wrapping around each half of the fruit and cutting it from the pit, as I shall hereinafter fully explain.

My machine, while applicable for any kind of fruit having pits or stones, is particularly designed for use in preparing peaches, and more especially that class of said fruit known as "clingstone" peaches, in which the meat adheres to the stone so tenaciously that it has been heretofore very difficult to release it.

Referring to the accompanying drawings, Figure 1 is a perspective view of my machine. Fig. 2 is a perspective view of a portion of frame A, showing a rear view of the knives C D. Fig. 3 is a view of handle L and chain K.

A is a frame mounted on a table or stand, B, and having secured within it the lower or stationary knife, C. This knife consists of a plate, of suitable metal, having a V-shaped cutting-edge formed in its top.

D is the upper or reciprocating knife, consisting of a similar plate, and mounted in guides *e* in the frame A, in such position as to adapt it in sliding down to overlap the lower knife. Its lower end is formed into an inverted-V-shaped cutting-edge, the cutting-edges of both knives thus inclosing a central space, the area of which is diminished and increased as the upper knife is reciprocated. In the angle of the cutting-edge of each knife is secured a band or thimble, *c d*, respectively. The upper knife is reciprocated by the following means: Arms *f* extend downward from it and have a cross-head, F, with which is connected a rod, G, joined to a treadle, H, below.

Connected with the top of the plate or knife D and the top of frame A is a spring, J. When the treadle is pressed down, the knife D is drawn down, and when the treadle is released the spring J brings the knife up again.

K K are fine chains connected with the bottom of the frame A by springs *k k*. One of these chains extends up beside the back of the lower knife and passes through a hole to the front, while the other extends up in front and passes through a hole to the back. The ends of each chain are provided with handles L, the peculiarity of which I shall presently explain.

The operation of my machine is as follows: The fruit is placed in the space inclosed between the two knives, and the upper one is brought down. This space decreases in area by reason of the approaching edges of the knives, and therefore the fruit is soon encompassed and penetrated by the knives to its pit, which is held, top and bottom, by the thimbles *c d*. If the fruit be a freestone, the halves will fall away to each side, leaving the pit remaining between the thimbles, and it may then be removed; but if a clingstone fruit—such as a peach of this character—is being used, something more is required to cause the meat to leave the stone. While the peach is held as above described, cut to the stone, which is retained by the thimbles, I take one of the handles L and draw the chain around the half of the peach as close as possible to the plate of the knife, and by a slight downward pressure cut the half of the stone. Then the other half is similarly treated. The springs *k k* take up the slack of the chains and keep them always in position. Now, my object in passing each chain through from one side to the other is to make them lie as close to the knife as possible, so that in winding them over the fruit they will hug the cut, and thus waste none of the meat. This would not necessarily be the case if each chain were brought up on its own side, as it would require much attention and loss of time to accurately adjust it for the cut; but arranged as shown they must lie close to the knife, and can be perfectly adjusted to cause no waste at all. For the same reasons I make the handles taper down to a thin edge or point, to which the chain is secured. This I do by extending a fine rod, *l*, outward from the handle and connecting the chains with its end. The end of this rod may be pressed against and run around the knife, keeping the chain close to its surface much better than if the handle terminated abruptly.

Although I have herein illustrated chains as the means for cutting off the halves, I do not wish to be understood as confining myself thereto. I might and could use a string, a cord, a fine wire, or a piece of catgut, or any other flexible line of any material. Any of these would accomplish the result equally as well, though there might be other reasons—such as durability and cleanliness—which would lead to the adoption of one rather than another.

I am aware that there have been machines made which punch the stone or pit right through the fruit; but it is obvious that in such an operation much waste is occasioned in direct ratio to the size of the pit, which in a peach is considerable. The stone, in being punched through, must carry with it a portion of the meat equal in diameter to itself; but in my machine no such loss is occasioned. The thimbles may be made just large enough to firmly fit the points of the stone, and the cutting-edges of the knives make a clean incision on all sides to the stone.

Having thus described my invention, what I claim as new, and desire to secure by Letters Patent, is—

1. In a fruit cutting and pitting machine, the knives having V-shaped cutting-edges inclosing a space for the reception of the fruit, each knife having a socket in the angle of its cutting-edge for fitting the points of the pit, and a means for bringing the knives together until their cutting-edges meet the stone and their sockets fit its points, substantially as herein described.

2. In a fruit cutting and pitting machine, the frame A and stationary knife C, having a V-shaped cutting-edge in its top and a thimble or band, c, in the angle thereof, in combination with the knife D, fitted to slide in guides in said frame, and having an inverted-V-shaped cutting-edge in its bottom, with a thimble or band, d, in its angle, the arms f on said knife, having cross-head F, the rod G and treadle H, and the return-spring J, substantially as herein described.

3. In a fruit cutting and pitting machine, knives for encircling and cutting the meat of the fruit to the pit, and means for holding the pit, in combination with a flexible line for encircling each half of the fruit and cutting it from the pit, substantially as herein described.

4. In a fruit cutting and pitting machine, the frame A, stationary knife C, having a V-shaped cutting-edge, with a thimble or band, c, in its angle, and the reciprocating knife D, having an inverted-V-shaped cutting-edge, with a thimble or band, d, in its angle, in combination with the flexible lines K K, passing through the stationary knife, one from back to front, the other from front to back, and the springs k k, securing them to the frame, substantially as herein described.

5. In a fruit cutting and pitting machine, the knives C D and thimbles c d, arranged and operating as herein described, in combination with the flexible lines K K, arranged as shown, the springs k k, and the fine-pointed handles L on the ends of the lines, substantially as herein described.

In witness whereof I have hereunto set my hand.

CHARLES ALISON.

Witnesses:
WM. F. BOOTH,
S. H. NOURSE.